United States Patent [19]

Fuisz et al.

[11] Patent Number: 5,279,849

[45] Date of Patent: Jan. 18, 1994

[54] DISPERSIBLE POLYDEXTROSE, COMPOSITIONS CONTAINING SAME AND METHOD FOR THE PREPARATION THEREOF

[75] Inventors: Richard C. Fuisz, Great Falls, Va.; Alvan W. Pyne, Kinnelon; Bernard C. Sekula, High Bridge, both of N.J.

[73] Assignee: Fuisz Technologies Ltd., Chantilly, Va.

[21] Appl. No.: 881,603

[22] Filed: May 12, 1992

[51] Int. Cl.⁵ .................................................. A23L 1/09
[52] U.S. Cl. ........................................ 426/658; 426/660
[58] Field of Search ............... 426/564, 572, 658, 660

[56] References Cited

U.S. PATENT DOCUMENTS

| | | | |
|---|---|---|---|
| 2,826,169 | 3/1958 | Le Veen | 119/1 |
| 2,918,404 | 12/1959 | Mende et al. | 167/58 |
| 3,019,745 | 2/1962 | Du Bois et al. | 107/8 |
| 3,036,532 | 5/1962 | Bowe | 107/8 |
| 3,067,743 | 12/1962 | Merton et al. | 128/270 |
| 3,070,045 | 12/1962 | Bowe | 107/8 |
| 3,073,262 | 1/1963 | Bowe | 107/8 |
| 3,095,258 | 6/1963 | Scott | 18/54 |
| 3,131,428 | 5/1964 | Mika | 18/8 |
| 3,308,221 | 3/1967 | Opfell | 264/174 |
| 3,324,061 | 6/1967 | Tanquary et al. | 260/29.2 |
| 3,557,717 | 1/1971 | Chivers | 107/54 |
| 3,595,675 | 7/1971 | Ash et al. | 99/130 |
| 3,615,671 | 10/1971 | Schoaf | 99/78 |
| 3,625,214 | 12/1971 | Higuchi | 128/260 |
| 3,723,134 | 3/1973 | Chivers | 99/134 |
| 3,762,846 | 10/1973 | Chivers | 425/7 |
| 3,856,443 | 12/1974 | Salvi | 425/9 |
| 3,875,300 | 4/1975 | Homm et al. | 424/48 |
| 3,925,525 | 12/1975 | LaNieve | 264/40 |
| 3,930,043 | 12/1975 | Warning et al. | 426/515 |
| 3,951,821 | 4/1976 | Davidson | 128/287 |
| 3,967,623 | 7/1976 | Butterworth et al. | 128/287 |
| 3,992,265 | 11/1976 | Hansen | 195/127 |
| 4,090,920 | 5/1978 | Studer, Jr. | 195/127 |
| 4,136,145 | 1/1979 | Fuchs et al. | 264/164 |
| 4,153,512 | 5/1979 | Messner et al. | 195/103.5 |
| 4,293,570 | 10/1981 | Vadasz | 426/3 |
| 4,303,684 | 12/1981 | Pitchon et al. | 426/312 |
| 4,371,516 | 2/1983 | Gregory et al. | 424/22 |
| 4,376,743 | 3/1983 | Dees | 264/103 |
| 4,492,685 | 1/1985 | Keith et al. | 424/28 |
| 4,496,592 | 1/1985 | Kuwahara et al. | 426/5 |
| 4,500,546 | 2/1989 | Turbak et al. | 514/781 |
| 4,526,525 | 7/1985 | Oiso et al. | 425/9 |
| 4,585,797 | 4/1986 | Cioca | 514/773 |
| 4,619,833 | 10/1986 | Anderson | 426/548 |
| 4,793,782 | 12/1988 | Sullivan | 425/7 |
| 4,855,326 | 8/1989 | Fuisz | 514/777 |
| 4,873,085 | 10/1989 | Fuisz | 424/400 |
| 4,885,281 | 12/1989 | Hanstein | 514/53 |
| 4,978,537 | 12/1990 | Song | 426/5 |
| 4,997,856 | 3/1991 | Fuisz | 514/777 |
| 5,011,532 | 4/1991 | Fuisz | 106/215 |
| 5,028,632 | 7/1991 | Fuisz | 514/772 |
| 5,034,421 | 7/1991 | Fuisz | 514/772 |
| 5,096,492 | 3/1992 | Fuisz | 106/215 |

FOREIGN PATENT DOCUMENTS

| | | |
|---|---|---|
| 88/2770 | 4/1988 | South Africa . |
| 88/2771 | 4/1988 | South Africa . |
| 89/9318 | 12/1989 | South Africa . |
| 90/2139 | 3/1990 | South Africa . |
| 90/8406 | 8/1991 | South Africa . |

*Primary Examiner*—Jeanette Hunter
*Attorney, Agent, or Firm*—Hoffmann & Baron

[57] ABSTRACT

Polydextrose or polydextrose feedstock containing esculent material is subjected to melt-spinning to make it readily dispersible in solid and aqueous media and provide the basis for numerous edible materials. Examples of such materials include ready-to-use products such as soup mixes, gravies, peanut butter and condiments including catsup and mustard.

20 Claims, No Drawings ns made therefrom.
DISPERSIBLE POLYDEXTROSE, COMPOSITIONS CONTAINING SAME AND METHOD FOR THE PREPARATION THEREOF

BACKGROUND OF THE INVENTION

The present invention relates to novel polydextrose materials and to methods for preparing the same. In particular, the invention relates to readily dispersible forms of polydextrose and to various esculent compositions made therefrom.

In commonly-assigned U.S. Pat. Nos. 4,855,326 and 4,873,085, various active agents having pharmacological and/or cosmetic properties were combined with readily watersoluble melt-spinnable materials such as sugars or cellulosic substances. Active agents spun with such materials demonstrate enhanced solubility. Commonly-assigned U.S. Pat. No. 5,011,532 and U.S. Pat. No. 5,096,492 contain examples of oleaginous substances that are mixed with sugar and melt-spun. The spun products disperse readily in water, forming colloidal or pseudo-colloidal dispersions.

Polydextrose is a material which has recently become more widely available. It has been found to have many desirable properties. For instance, it has stimulated interest for possible use in the preparation of low-calorie, or "light" foods. It has also been included in various food products, but its solubility and dispersibility are not as great as might be desired in many instances.

SUMMARY OF THE INVENTION

The present invention is a novel polydextrose and polydextrose-containing products prepared by melt-spinning a polydextrose feedstock to produce a polydextrose matrix. The polydextrose matrices of this invention are readily dispersible in solids and liquids. Readily dispersible means that the polydextrose matrix can be mixed with reduced mechanical mixing force as compared to polydextrose feedstock which has not been melt spun.

Numerous materials can be melt-spun with polydextrose, conferring improved dispersion and solubility properties on the total product. These novel products have a wide variety of uses including comestibles and a variety of other products.

The present invention also includes novel processes for preparing a wide variety of melt-spun polydextrose-containing products. In this regard, the polydextrose-containing products are produced by admixing adjuvant materials and polydextrose, melt-spinning the mixture and recovering the product.

DETAILED DESCRIPTION OF THE INVENTION

The processes of this invention permit the treatment of polydextrose to provide novel products. The melt-spinning of the polydextrose allows alteration of its various physical, and in some instances its apparent chemical properties. Thus, the polydextrose and the products containing it can be altered with respect to solubility, wetability, and/or dispersibility in aqueous (and in some cases, other) media. The hydrophobic or lipophobic characteristics of the polydextrose can be modified to provide new food products. In some aspects, the products of this invention can be used in lieu of freeze-dried materials.

The powder form of polydextrose is somewhat like powdered milk or similar products in that it can be difficult to dissolve or disperse. Vigorous stirring is required to incorporate it into water or aqueous liquids and it can lump or form difficult-to-disperse clumps of material. In contrast, the melt-spun polydextrose of the invention enters into a dispersion in aqueous liquids and water rapidly, with little or no mechanical agitation being required. Thus, the melt-spun polydextrose of this invention no longer clumps, flows readily, and easy to disperse.

Polydextrose is a partially-metabolizable water-soluble polymer which can be obtained from the condensation of a melt of D-glucose, sorbitol, and citric acid. Polydextrose contemplated for use herein is a polysaccharide which is resistant to hydrolysis in the human alimentary tract and accordingly furnishes relatively few calories. Its taste can range from almost flavor-less to slightly salty or slightly bitter alkaline flavor. One of the features of the novel polydextrose obtained according to this invention is that it is relatively bland-tasting. The novel polydextrose of this invention not only has better dispersion properties, but it can be used to hold and release, or release in a controlled manner, adjuvant substances with which it is readily combined according to the processes of the present invention.

As noted above, the products of this invention are prepared by a melt-spinning operation. One of the preferred routes for such melt-spinning is through use of apparatus such as those adapted to the production of cotton candy, or floss, from sugar. Illustrative of such machines are the Econo Floss machine Model 3017 manufactured by Gold Medal Products Co. of Cincinnati, Ohio. For simplicity in disclosing and describing this invention, the term "melt-spinning" will be understood to mean that combination of temperature, flow, flow rates, mechanical forces, and thermal gradients through the processing which is of the type exerted by operation in the cotton candy-type of machine.

For ease of description, the process will further be disclosed with reference to the cotton candy-type of apparatus. Process parameters which affect the melt-spun polydextrose include the temperature of the ribbon which is an electrically-heated resistance element found in the spinning head of the machine. Too low a temperature will either simply cause the ribbon to act as a sieve and throw unmolten particulate material into the collection bowl. Too high a temperature for a given throughput of material through the melt-spinning head will cause the material to degrade, singe, char, or burn. One of the great advantages of the present process is that the polydextrose and any components of any composition associated with the polydextrose are generally not subject to any substantial degree of degradation. As a general rule, if the polydextrose is not singed, scorched or burned, the associated components will also be safe from degradation.

The nature and amount of other components associated with the polydextrose will vary the properties of the melt-spun mixture. For example, some water can be present in certain embodiments of the process used to prepare the products. It has been found that the addition of water to the melt-spinning feed material decreases the spinning temperature at a given power input to the melt-spinning ribbon. The addition of water also changes the rheology of the melt-spun material and can shorten the length of the floss fiber and/or of any spicule-like particles formed.

One of the important uses for the polydextrose and polydextrose-based materials provided by the processes of this invention is the preparation of esculent or edible materials. Not only does the melt-spun polydextrose become more versatile by virtue of its increased dispersibility in aqueous media and other improved properties, but it also forms the basis for providing numerous esculent materials. The melt-spinning operation somehow tailors or alters the polydextrose so that it is able to hold or to combine incompatible food materials.

Thus, melt-spun polydextrose can be used to hold oleaginous substances without apparent separation and yet permit such oleaginous materials to perform their usual functions in food materials. The oleaginous materials can be included in the melt-spun polydextrose with numerous hydrophilic materials with which the oleaginous material would otherwise be incompatible. Moreover, a variety of hydrophilic materials can be held together in a food product or ingredient and yet be able to fulfill their separate functions when, for instance, they are dispersed in aqueous media.

The melt-spun polydextrose can accordingly maintain the relative quantities of materials required in food products or in products usually used for food. Thus, in one aspect of the invention, ingestible food and food ingredient materials can be admixed and combined with the polydextrose prior to melt-spinning of the mixture. Ingredients suitable for admixture with the polydextrose starting material include ready-to-use products such as soup mixes, beverage mixes, food sauces, gravy mixes, condiments, flavor compositions and components of flavor compositions, nutritional supplements, low-calorie food materials, food conditioning agents, expressed vegetable fluids such as orange juice and tomato juice, natural and/or synthetic sweeteners, acidifying agents, alkalizing agents, vitamins, minerals, food supplements, extracts, spices, seasonings, amino acids, polypeptides, reducing sugars to permit Maillard browning, food grade vehicles such as propylene glycol, and the like. Indeed, any ingestibly acceptable material is susceptible of incorporation in or use with the polydextrose melt-spun according to the invention.

One of the products prepared according to this invention is improved soup mixes. These materials are frequently prepared from various dehydrated components which are packaged to protect them from ambient moisture and/or humidity. These mixes are generally unable to support significant quantities of oleaginous components. Moreover, oleaginous materials are incompatible with dehydrated components. Oleaginous components are difficult to disperse in aqueous media and it is usually desirable to keep the soup mix as a relatively free-flowing powder rather than a paste, as would be the case if it were combined with large quantities of fats or oils.

The melt-spun polydextrose compositions of the present invention overcome the prior art difficulties by making it possible to combine both a fat and/or oil component with conventional soup mix ingredients. The resulting product according to this invention is readily dispersible in hot or warm water, just as in the conventional or basic soup mix, but with the incorporation of the oleaginous component, it has a much richer flavor and an improved, rich mouthfeel. Thus, the organoleptic properties of the soup prepared from the compositions of this inventions are greatly improved.

Another advantage of soup mixes prepared in accordance with the present invention is that a sensation of a rich, full soup can be achieved with caloric savings over standard products. This is apparently due to two factors. First, the fatty materials present seem to have their activity enhanced, allowing the total quantity can be decreased. Second, polydextrose provides a fuller flavor and improved mouthfeel, further reducing the oleaginous material required for good flavor impression. It has been found that the melt-spun materials when suspended in cold or warm water quickly disperse to provide a colloidal or colloidal-like dispersion. Moreover, the flavor seems to be more rounded, with less sharp spiciness. Saltiness is enhanced by comparison to a control sample, so that lower quantities of salt can be utilized.

One type of soup mix according to the present invention comprises polydextrose, an oleaginous component and a soup base component. The oleaginous component can be a conventional edible glyceride fat or oil. In certain desirable embodiments of the invention, the oleaginous component is an unhydrogenated or lightly hydrogenated vegetable oil, such as corn oil, cottonseed oil, sesame oil, grapeseed oil, sunflower seed oil, rapeseed oil, peanut oil, and like oils. The soup base component can be widely varied depending upon the particular flavor and type of soup. Some soups such as split pea are relatively thick and heavy, while others such as a vegetable soup or broth are much thinner and lighter in texture and taste. The soup base can comprise vegetables, starches, extracts, spices, herbs, thickeners, and the like. One advantage of the use of melt-spun polydextrose soups according to the present invention is that they have a good full rich mouthfeel without the use of large quantities of oleaginous substances or thickeners.

The need to melt-spin the soup mix can preclude the use of soup bases containing large pieces of material such as noodles, vegetable slices, and the like, but the advantages can still be obtained by combining the polydextrose, oleaginous component, and a soup base component free of large particles. The resulting melt-spun polydextrose-containing product can have such large solid materials added after the melt-spinning. The advantages of superior taste, richness and mouthfeel can still be obtained.

In general, in the preparation of soup mixes, the mixture to be melt-spun contains from about 25 to 70 percent polydextrose, from zero to 40 percent oleaginous component, and from 20 to 70 percent of the soup base component.

A related product prepared according to the invention is gravy and white sauce mix compositions. Generally, these are prepared in the same manner as the soup mixes, but with meat extracts, protein hydrolysates and the like in gravies. The white sauces are similarly prepared to contain flour and dairy components to give them their distinctive flavor and properties. Here again, the use of melt-spun polydextrose assists in dispersing the ingredients in aqueous mixtures and in providing a rich mouthfeel. The minimum amount of polydextrose in this embodiment is, in general, about 24 percent.

In certain embodiments of the invention, it appears that colloidal or colloidal-like material heats up differently than conventional materials do. This effect seems to occur as though the heat is actually stored in the dispersion and then is given up rapidly upon stirring or other manipulation. The effect occurs with microwave heating, as well as with more conventional culinary heating methods.

Another product uniquely available according to the claimed invention is flaked or granular peanut butter. The peanut butter compositions according to the present invention are made from melt-spinning polydextrose, peanut butter, and optionally an additional oleaginous component. The melt-spun solid peanut butter products are in themselves tasty. The melt-spun solids also have a variety of uses in the culinary and confectionery arts. For example, the peanut flakes and granules of this invention can be used to flavor salads, vegetables or other esculent materials. In the confectionery art, the spun products lend a strong, rich peanut flavor to chocolate confections.

As with other products according to this invention, a homogeneous mixture of polydextrose and peanut butter is prepared. The mixture can also contain an oleaginous component, for example, corn oil, to provide a richer flavor, or it can contain sweeteners such as honey, sugar, and the like. The peanut butter compositions according to the present invention contain sufficient polydextrose to act as a carrier. Generally, such compositions contain from about 10 to about 99 percent polydextrose, from about 70 to about one percent peanut butter, from about zero to about 20 percent of an oleaginous component, and from about zero to about 20 percent of a sweetener. In some instances, the quantity of sweetener could be up to about 30 percent.

Another product according to the present invention is a ready-to-use mustard. This novel product is well-suited for use in foods including salads, sandwiches, and as a condiment on ham, beef, and other meat products. The mustard product is prepared by melt-spinning a mixture comprising polydextrose and a mustard base. In general, these compositions contain from about 50 to about 95 percent polydextrose and from about 5 to about 50 percent mustard base. As used herein, the mustard base includes mustard or ground mustard seed and can also include the adjuvants used in the manufacture of prepared mustard.

These mustard adjuvants include vehicles such as vinegar and water and spices such as tumeric, and the like. The mustard adjuvants are desirably combined with ground mustard seed, and the ingredients are combined into a homogeneous mixture. The mustard component is combined with the polydextrose and the combination is melt-spun. The resulting solid material recovered from the melt-spinning is in effect a dry, stabilized mustard product. It is readily used by combining it with meat, poultry, salad ingredients, vegetables and the like to provide a mustard flavor. It can be used in prepackaged, ready-to-eat foods or it can be used as a condiment on salads and the like.

A further product according to the present invention is a ready-to-use catsup. This novel product is well-suited for use in food preparation including salads, sandwiches, eggs, vegetables and as a condiment on meats. The catsup product is prepared by melt-spinning a mixture comprising polydextrose and a catsup base. In general, these compositions contain from about 50 to 90 percent polydextrose and from 10 to 50 percent catsup base. As used herein, the catsup base includes tomatoes or a tomato product such as tomato paste and can also include the adjuvants used in the manufacture of prepared catsup.

It will be understood from the present description that the particle size of the adjuvants is such that the product can be efficiently melt-spun. In general, microparticulation of the starting material prior to processing according to the invention will facilitate the melt-spinning.

These catsup adjuvants include vehicles such as water, spices such as salt, onions, garlic, natural and artificial flavors, and sweeteners such as corn syrup, sucrose, dextrose and the like. It will be understood by those skilled in the art that the adjuvants can be added in a number of forms; thus, fresh onions or onion powder or dehydrated onions or a combination thereof can be used. The catsup adjuvants are desirably combined with the tomato component, and the ingredients are combined into a homogeneous mixture. The catsup component is combined with the polydextrose and then melt-spun. The resulting solid material recovered from the melt-spinning is in effect a dry stabilized tomato catsup product. It is readily used by combining it with meat, poultry, salad ingredients, vegetables and the like to provide a catsup flavor. It can be used in prepackaged, ready-to-eat foods or it can be used as a condiment on salads and the like.

Another esculent material readily prepared according to the present invention is a reduced oil mayonnaise-like product. A key to the preparation of such materials is the use of polydextrose with an oleaginous component in melt-spun form. A mixture containing polydextrose and a natural or very lightly hydrogenated vegetable oil, such as corn, soybean, sunflower seed, cottonseed, grapeseed, sesame, rapeseed or the like oil is melt-spun and a solid product is recovered. Generally, the polydextrose is present in an amount greater than the oleaginous component for this embodiment of the invention. The quantity of oleaginous material should be sufficient to provide a reasonable quantity of oil in the recovered solids, but it should not be enough to cause the solids to become patently oily. In general, the oleaginous component should comprise from 10 to 50 percent of the melt-spun material.

The mayonnaise-like product is prepared by beating egg yolks and adding the melt-spun polydextrose oleaginous component product. This mixture is then flavored with salt, mustard, vinegar, citrus juice, and the like. In addition to the foregoing flavor constituents, other conventional ingestibly acceptable ingredients, including vehicles such as water and preservatives and/or antioxidants such as calcium disodium ethylene diamine tetra-acetic acid and butylated hydroxyanisole and the like, can be used. The result is a very appetizing mayonnaise-like food which can be used in all the instances where mayonnaise or salad dressing is used. The advantage of this product is its lower fat content when compared to conventional mayonnaise products.

In another desirable embodiment of the invention, it is possible to use melt-spun polydextrose compositions of this invention for gelling with xanthan and other gums. The gelling compositions are prepared by melt-spinning a mixture of polydextrose and a gelling agent such as xanthan gum. The quantity of gelling agent in the composition should be sufficient to provide the necessary gelling; on the other hand, it must be incorporated into the polydextrose so that it is held until ready for use. It is desirable in certain embodiments that the gelling compositions according to the invention contain from three to 50 percent of the gelling agent, depending upon the gelling agent used, with the remainder substantially being polydextrose. In certain preferred embodiments, the quantity of gelling agent is from five to 20 percent.

In use, the melt-spun polydextrose-based gelling agent is, for instance, dispersed in water or an aqueous liquid. The gelling agent or gums are frequently difficult to dissolve or disperse in the liquid to be gelled. The novel melt-spun gelling Compositions according to the invention, however, readily disperse and gel rapidly.

When polydextrose and polydextrose materials are melt-spun according to the present invention, a solid material results. It is frequently in the form of spicule-like particles, which varies according to the material and the process conditions. Under some processing conditions, such as running the melt-spinning operation at higher or lower temperatures, the sold product formed will vary from particulate to floss-like. With some mixtures, higher processing temperatures produce a floss-like material; with others, a particulate material is obtained at the higher temperature.

EXAMPLES

The following Examples are given to provide further appreciation of the invention but are not meant in any way to restrict the effective scope of the invention. The Examples were carried out on an Econo Floss machine Model 3017, manufactured by Gold Medal Products Co., Cincinnati, Ohio, U.S.A. Unless otherwise stated, the ribbon used in the spinning machine is a 110-volt nominal ribbon operated at about 300° F., and the operating speed of the spinning head was 3800 rpm. All parts, percentages, proportions and ratios herein are by weight unless otherwise stated.

EXAMPLE I

A sample of one-third cup of Polydextrose K (a product of the Pfizer Company, NY, N.Y.) in free-flowing form was melt-spun and provided white flakes. Five grams of this flake material readily dispersed in 25 ml of water. A similar 5 g amount of an untreated polydextrose sample failed to disperse readily and tended to form clumps.

EXAMPLE II

A viscous slurry of one-third cup of polydextrose, one capful of spice chili oil and one capful of corn oil was melt-spun and provided strongly flavored flakes. When added to water, the spun product readily dispersed to provide a colloidal form which had a strong chili flavor and odor.

EXAMPLE III

In this Example, 24 grams of sifted commercial soup mix, 24 grams of polydextrose and 11 grams of corn oil were mixed thoroughly and melt-spun. The resultant product was in the form of a granular or spiculate solid particles.

The spun product was placed in a cup of warm water. The particulate formed a suspension which was colloidal and substantially dispersed soup. The flavor of this product was described as well-rounded.

As a comparison, 29 g of sieved soup mix, 28 g of polydextrose and 11 g of corn oil are thoroughly mixed but not subjected to the melt-spinning operation.

This mixture was added to one cup of warm water but did not disperse. Moreover, the flavor was perceived as being spicier and less rounded than that provided by the spun product. The oil in the unspun mixture separated to the top of the vessel.

EXAMPLE IV

A mixture is 100 g of polydextrose and 20 g of margarine was melt-spun to provide a particulate solid in the form of spicules which were slightly oily but without taste.

EXAMPLE V

A mixture of 100 g of polydextrose and 20 g of corn oil was melt-spun at a high temperature and at a low temperature.

The mixture spun at high temperature and provided solids in the form of a floss. A similar mixture was that spun at a low temperature and provided solids in particulate form with the shape of spicules. Thus, it can be seen that the temperature at which the melt-spinning is carried out has an effect on the final product.

EXAMPLE VI

In this Example, 30 g of polydextrose and 70 g of commercial creamy (as distinguished from chunky) peanut butter were mixed in a Cuisinart food processor using the steel blade for three minutes before being melt-spun. The melt-spun product was in the form of small-particulates and soft, flake-like material. The oleaginous component of the product appeared to be colloidal in nature, and the product had a dry appearance. The flavor was very good and judged to be superior to that of the unspun peanut butter. It will be noted that in spite of this product containing 30 percent polydextrose, superior peanut butter texture and taste properties were realized.

In this type of process, it appears that the melt-spun polydextrose-peanut butter combination provides a good, low-cost alternative to freeze-drying. This produces a high quality dried product with very acceptable flavor.

EXAMPLE VII

A mixture containing 100 g of polydextrose K and 25 g of Mazola brand corn oil were mixed in a Cuisinart food processor using the steel blade for three minutes. The resulting mixture was melt-spun using a 130 volt ribbon in the melt-spinning apparatus and the lowest possible heat setting.

The resulting solid product was in form of small grains or crystallites. When water was added, a colloidal dispersion quickly formed. In this Example, it was observed that the melt-spun polydextrose products are not always in the form of a floss or spicules.

EXAMPLE VIII

A mixture was prepared by beating three egg yolks in a Kitchen Aid mixer using the wire whisk for three minutes during which 15 g of the spun product obtained from Example VII was added into the mixing bowl while the yolks were being beaten. The granular oleaginous containing material was found to blend right into the mixture.

To this mixture, the juice of one lemon, one teaspoonful of salt, and ⅛ teaspoonful of mustard powder and two teaspoonfuls of white vinegar were added and the resultant mixture was beaten for three minutes. The result is a delicious mayonnaise containing substantially less than the cup of oil for which the recipe calls for. The product also had an appearance found to be typical of the colloidal or colloidal-like materials produced according to this invention.

It will be apparent to those skilled in the art that the present invention provides the capability of making foods with a greatly reduced fat content, while at the same time providing desirable organoleptic properties such as a creamy mouthfeel.

EXAMPLE IX

In this Example, a slurry containing 52.6 parts of sieved soup mix, 26.3 parts polydextrose, and 21.1 parts of corn oil was melt-spun. The resultant product was in the form of particulate material and more particularly semifloss or micro-spicules. When the particulate material was added to one cup of warm water, an instantaneous dispersion was formed having a colloidal-like appearance. In addition, no evidence of fat layering in the top of the container was observed. The soup flavor was observed as being quite pleasant in taste and slightly rounded in flavor and less salty than the unspun product. The soup has a roux-like mouthfeel, which is quite pleasant.

The dehydrated vegetable material and other ingredients of the soup mix package initially sieved from the mix were added to the dispersion with an additional cup of warm water and heated in a sauce pan. A control mix was also prepared in exactly the same manner using the soup mix straight from the packet and the same amount of water for hydration. Surprisingly, it was observed that the soup prepared from the polydextrose appears to come to a boil much more quickly than the control. Further, the melt-spun polydextrose-containing mix appeared to boil differently; it seemed to have more effervescent bubbles than the control. This result is far more marked when plastic containers were used when compared to glass containers in a microwave oven.

EXAMPLE X

In this Example, a mixture containing 240 g of polydextrose, 30 g of corn oil, and 30 g of Gulden's ® prepared mustard was melt-spun. The resultant product had a mustard flavor and when added to water, it appeared to form a colloidal dispersion.

EXAMPLE XI

A mixture containing 90 g of polydextrose and 60 g of real mayonnaise was melt-spun. The melt-spinning was conducted using a low temperature ribbon rated at 130 volts, 8 amp., using normal 120-volt household electric current. The melt-spun solid product is particulate, in the form of spicules.

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A polydextrose product comprising a matrix prepared by subjecting a polydextrose feedstock to a combination of conditions of temperature, mechanical forces, and thermal gradients present during melt spinning, said polydextrose being present in said feedstock in an amount sufficient provide a throughput, whereby the structure of the polydextrose feedstock is altered and results in a discontinuous, coherent matrix.

2. The polydextrose product of claim 1, wherein said feedstock further comprises an esculent material.

3. The product of claim 2, wherein said esculent material is selected from the group consisting of oleaginous substances, soup bases, dry soup mixes, peanut butter, food sauces, gravy mixes, condiments, catsup, catsup bases, mustards, mustard bases, eggs, egg yolks, nutritional supplements, low-calorie food materials, edible food extracts, spices, gelling agents and mixtures thereof.

4. The product of claim 3, wherein said polydextrose matrix contains from about 25 to about 70% by weight polydextrose.

5. The product of claim 3, wherein said esculent material is oleaginous substances present in an amount of up to 40% by weight of said polydextrose matrix.

6. The product of claim 3, wherein said esculent material is soup base present in an amount of from about 20 to about 70% by weight of said polydextrose matrix.

7. The product of claim 3, wherein said esculent material is peanut butter present in an amount of from about 1.0 to about 70% by weight of said polydextrose matrix.

8. The product of claim 7, wherein said polydextrose matrix further comprises an oleaginous material present in an amount of up to 20% by weight and a sweetener in an amount of up to about 30% by weight.

9. The product of claim 3, wherein said esculent material is mustard base present in an amount of from about 5 to about 50% by weight of said polydextrose matrix.

10. The product of claim 9, wherein said polydextrose matrix further comprises from about 5 to about 20% by weight of an oleaginous material.

11. The product of claim 3, wherein said esculent material is catsup base present in an amount of from about 10 to about 50% by weight of said polydextrose matrix.

12. The product of claim 3, wherein said esculent material is gelling agent present in an amount of from about 3 to about 50% by weight of said polydextrose matrix.

13. The product of claim 12, wherein said gelling agent is present in an amount of from about 5 to about 20% by weight of said polydextrose matrix.

14. A method of preparing a polydextrose product having improved dispersion properties in liquids, comprising:
a) subjecting a polydextrose feedstock to a combination of conditions of temperature, mechanical forces, and thermal gradients present during melt spinning, said polydextrose being present in said feedstock in an amount sufficient to provide a throughput, whereby the structure of the polydextrose feedstock is altered and results in a discontinuous, coherent matrix.

15. The method of claim 14, wherein said feedstock further comprises an esculent material.

16. The method of claim 15, wherein said esculent material is selected from the group consisting of oleaginous substances, soup bases, dry soup mixes, peanut butter, food sauces, gravy mixes, condiments, catsup, catsup bases, mustards, mustard bases, eggs, egg yolks, nutritional supplements, low-calorie food materials, edible food extracts, spices, gelling agents and mixtures thereof.

17. A method for preparing an edible product, comprising:
combining an edible material with a polydextrose matrix prepared by subjecting a polydextrose feedstock to a combination of conditions of temperature, mechanical forces and thermal gradients present during melt spinning, said polydextrose being present in said feedstock in an amount sufficient to provide a throughput, whereby the structure of the polydextrose feedstock is altered and results in a discontinuous, coherent matrix.

18. The method of claim 17 where said feedstock further comprises an esculent material.

19. An edible product comprising: an edible material and a polydextrose matrix prepared by subjecting a polydextrose feedstock to a combination of conditions of temperature, mechanical forces and thermal gradients present during melt spinning, said polydextrose being present in said feedstock in an amount sufficient to provide a throughput, whereby the structure of the polydextrose feedstock is altered and results in a discontinuous, coherent matrix.

20. The product of claim 19 wherein said feedstock further comprises an esculent material.

* * * * *